UNITED STATES PATENT OFFICE.

HENRY BLUMENBERG, JR., OF LOS ANGELES, CALIFORNIA, ASSIGNOR TO FRIEDA BLUMENBERG, OF NEW YORK, N. Y.

PLASTER COMPOSITION.

1,266,200.      Specification of Letters Patent.      Patented May 14, 1918.

No Drawing.      Application filed October 1, 1917. Serial No. 194,270.

*To all whom it may concern:*

Be it known that I, HENRY BLUMENBERG, Jr., a citizen of the United States, residing at Los Angeles, in the county of Los Angeles and State of California, have invented new and useful Improvements in Plaster Compositions, of which the following is a specification.

My invention relates to a plaster composition and the process of making the same, whereby superior plaster is produced at a minimum cost.

Various methods have been suggested and patented relating to prepared gypsum, commonly called wall plaster, so that it would work more evenly when applied with a trowel. Such methods propose to mix inert ingredients, such as fine silica, kieselguhr, clay, silicate of alumina, and talcum, with the gysum, the latter being ground to an impalpable powder, to cause the same to work smoothly under a trowel.

Some of these methods have been successful, but all have been, as a rule, too expensive to apply for the reason that while the ingredients above mentioned may be cheap commodities in themselves, they were often miles away from where the gypsum was mined and calcined, and consequently had to be shipped to the gypsum mill and then mixed and re-shipped, making the cost as a rule prohibitive; for calcined gypsum in itself is a comparatively low-priced commodity and cannot stand many treatments, mixing, or freight charges without materially increasing its cost.

Theoretically, one would assume that various samples of gypsum, all having the same chemical composition, would have the same physical properties, but practically this is not so. Samples of gypsum from different mines having practically the same chemical composition often show peculiar physical differences.

It is a well-known fact that the more finely a material is ground, the quicker will it enter chemical changes; but this fact notwithstanding, various samples of gypsum ground to only 80 to 100 mesh screen set quicker and faster than other samples from other localities running considerably finer. Consequently the following conclusions were arrived at after various tests, namely: that the setting of plaster depended mainly on either its crystalline or amorphous condition and not altogether on the degree of its pulverization, for if it is crystalline, it will set hard and fast, and will not take up sand and the like so readily. Furthermore, it requires additional physical exertion on the part of the mechanic applying quickly-setting plaster to the wall; but if the amorphous condition exists, the reverse is true. Having proven this, the problem to solve was to prepare the calcined plaster so that it was in an amorphous condition that could be worked smoothly and take up the agents that are generally added to wall plaster.

I found that even after calcining gypsum, ($CaSO_4 + 2H_2O$, di-hydrated calcium sulfate) to the point of dissociation where a hemi-hydrate $(CaSO_4)_2 + H_2O$ is formed, which is the product when the di-hydrate above is heated to 130° C., it still contained water of crystallization chemically combined with the $CaSO_4$ and as long as this water was combined it would be crystalline and not amorphous; but by heating it to 550° to 600° C., the last part of the water of crystallization is expelled, leaving $CaSO_4$, which is not crystalline and also possesses the power of hydration and hardening and which can be used like the hemi-hydrate, $(CaSO_4)_2 + H_2O$, but is not crystalline.

Care must be taken not to calcine over 600° C., for when this is done the gypsum loses all its power of hydration and hardening and is absolutely dead burnt. But even then, I find that by mixing the dead burnt gypsum with the hemi-hydrate this mixture will work as smoothly as the gypsum which has been calcined up to and around 560° C.

I prefer equal parts of the hemi-hydrated of calcium sulfate and dead burnt gypsum, although the proportions may be varied greatly and yet give good results. I have made the important discovery that while dead burnt gypsum, when mixed with water alone, has no power of hydration and hardening, and acts as an inert material, this is not so when it is mixed with the hemi-hydrated calcium sulfate as described above. I do not know the exact nature of the chemical or physical conditions or changes existing or taking place, but I find that by mixing dead burnt gypsum with hemi-hydrated calicum sulfate a superior plaster, which is denser and stronger than the plaster made of hemi-hydrate alone, is produced.

I find that the hydration of gypsum by my process depends solely upon the temperature of the calcination, for when the crystalline condition of the gypsum is broken down and the amorphous condition predominates, the setting is slow. If the reverse condition exists, the setting is fast.

My improved plaster is made of gypsum calcined at a temperature of 550° alone, or it is made of a mixture of dead burnt gypsum and hemi-hydrate of calcium sulfate. However, it is advisable to mix some of the hemi-hydrated calcium sulfate with gypsum calcined at a temperature of 550° to 600° C.

Both of these methods prepare the gypsum so that it will work smoothly under the trowel, and make a better, denser and smoother, finished product.

My process will make an easy-working, smooth plaster from all the material mined at the same source: namely, as an illustration, at Amboy, California, gypsum is being calcined and clay and kieselguhr have to be shipped long distances to this plant, while now, by using my process, they have all the natural products at their command without any additional expense by heating part of the gypsum to 600° C., where heretofore they had to ship in other material from distant points, causing additional freight, handling and merchandise charges.

I claim:

1. A plaster composition containing dead burnt gypsum and hemi-hydrated calcium sulfate.

2. A plaster composition containing substantially equal parts of dead burnt gypsum and hemi-hydrated calcium sulfate.

3. A plaster composition containing hemi-hydrated calcium sulfate and gypsum calcined at a temperature up to 600° C.

In testimony whereof I have signed my name to this specification.

HENRY BLUMENBERG, Jr.